US009431886B2

(12) United States Patent
Shimura et al.

(10) Patent No.: US 9,431,886 B2
(45) Date of Patent: Aug. 30, 2016

(54) METHOD OF MANUFACTURING A MAGNET PLATE FOR A LINEAR MOTOR

(75) Inventors: Yoshifumi Shimura, Yamanashi (JP); Takuya Maeda, Yamanashi (JP); Yuusuke Kondou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 122 days.

(21) Appl. No.: 13/588,295

(22) Filed: Aug. 17, 2012

(65) Prior Publication Data

US 2013/0049911 A1    Feb. 28, 2013

(30) Foreign Application Priority Data

Aug. 25, 2011  (JP) ................................. 2011-183764
Jul. 24, 2012  (JP) ................................. 2012-163992

(51) Int. Cl.
*H02K 15/03* (2006.01)
*H02K 15/12* (2006.01)
*H02K 41/03* (2006.01)
*H02K 1/27* (2006.01)

(52) U.S. Cl.
CPC ........... *H02K 41/031* (2013.01); *H02K 1/2706* (2013.01); *H02K 1/2786* (2013.01); *H02K 15/03* (2013.01); *H02K 15/12* (2013.01); *Y10T 29/49009* (2015.01); *Y10T 29/49012* (2015.01); *Y10T 29/49075* (2015.01); *Y10T 29/49078* (2015.01)

(58) Field of Classification Search
CPC .... H02K 15/03; H02K 15/12; H02K 41/031; H02K 1/2706; H02K 1/2786; Y10T 29/49009; Y10T 29/49012; Y10T 29/49075; Y10T 29/49078
USPC ...... 29/598, 607, 608, 609; 336/65, 96, 110, 336/234; 310/12.24, 12.25, 156.07, 156.12
See application file for complete search history.

(56) References Cited

U.S. PATENT DOCUMENTS

| 5,907,206 A * | 5/1999 | Shiga et al. ......... H02K 1/2786 |
| 5,952,742 A | 9/1999 | Stoiber et al. |
| 6,566,771 B1 | 5/2003 | Stoiber |

(Continued)

FOREIGN PATENT DOCUMENTS

| JP | 57-113762 A | 7/1982 |
| JP | 62052913 A * | 3/1987 .................... 29/607 |
| JP | 9-511380 A | 11/1997 |

(Continued)

OTHER PUBLICATIONS

A JP Office Action, dated Nov. 13, 2012, issued in JP Application No. 2012-163992.

(Continued)

*Primary Examiner* — A. Dexter Tugbang
(74) *Attorney, Agent, or Firm* — Hauptman Ham, LLP

(57) ABSTRACT

A method for producing a magnet plate for a linear motor is provided. The magnet plate comprises a base plate and a plurality of magnets juxtaposed to one another on a surface of the base plate. The method comprises providing the plurality of magnets on a surface of the base plate at a certain interval, placing the base plate into a mold, supplying a resin material into the mold, so as to form a resin molding covering the plurality of magnets on the surface of the base plate by means of injection molding, and magnetizing the plurality of magnets.

3 Claims, 3 Drawing Sheets

(56) References Cited

U.S. PATENT DOCUMENTS

| | | | |
|---|---|---|---|
| 7,350,283 B2 * | 4/2008 | Won et al. | ............. H02K 15/03 |
| 2011/0000079 A1 * | 1/2011 | Fukumaru et al. | ............. 29/598 |

FOREIGN PATENT DOCUMENTS

| JP | 2002-119039 A | 4/2002 | |
|---|---|---|---|
| JP | 2002-531042 A | 9/2002 | |
| JP | 2003-284314 A | 10/2003 | |
| JP | 2005-039898 A | 2/2005 | |
| JP | 2006-014457 A | 1/2006 | |
| JP | 2006-054972 A | 2/2006 | |
| JP | 2008-042967 A | 2/2008 | |
| JP | 2008-042987 A | 2/2008 | |
| JP | 200928936 A | 2/2009 | |
| JP | 2010142038 A | * | 6/2010 |

OTHER PUBLICATIONS

JP Office Action, dated Feb. 26, 2013 issued in JP Application No. 2012-163992.
Toyota Motor Corporation; Manufacturing Technique Dictionary; Dec. 24, 1985.
Plastic Molding Process Dictionary Editorial Committee; Plastic Molding Process Dictionary; Jan. 10, 1990.
Office Action mailed Jan. 7, 2014, corresponds to Japanese patent application No. 2012-163992.

* cited by examiner

METHOD OF MANUFACTURING A MAGNET PLATE FOR A LINEAR MOTOR

RELATED APPLICATIONS

The present application claims priority from, Japanese Application Nos. 2011-183764, filed Aug. 25, 2011 and 2012-163992, filed Jul. 24, 2012, the disclosures of which are hereby incorporated by reference herein in their entirety.

BACKGROUND OF THE INVENTION

1. Field of the Invention

This invention relates to a magnet plate for a linear motor and a method for producing thereof, and in particular, to a magnet plate used in a linear motor for providing linear movement of a machine tool and a method for producing thereof.

2. Description of the Related Art

A linear motor (linear driving device) is used in a machine tool, a manufacturing device for semiconductors, an industrial robot, a measuring device or a transporting device or the like, and essentially consists of a guide (stator) extending along a substantially straight line and a slider (rotor) moving along the guide. The guide includes a magnetic plate having magnets juxtaposed to one another such that a magnetization direction of one magnet is oriented to an opposite direction relative to that of other magnets adjacent thereto. Furthermore, a resign molding may be formed on a surface of the magnets juxtaposed on the magnet plate for the purpose of protecting the magnets from dusts and damages, maintaining its quality and improving durability (see JP 2002-119039A). In this case, it is necessary, for example, to grind the resin molding after the molding process, in order to reshape it into a suitable shape for its application. FIG. 6 shows a perspective view illustrating a grinding process for grinding the resin molding in a producing method of a magnet plate according to a prior art. As illustrated therein, the resin molding 100 is reshaped into a suitable shape by means of a grinding stone 102, for example. Since an expensive facility or a high level of skills is required in order to improve machining accuracy in such a grinding process, production costs tend to increase. Furthermore, an additional machining process can be the cause of lower productivity. Therefore, the object of the present invention is to provide a producing method for producing a magnet plate for a linear motor in which such a grinding process of a resin molding can be omitted, and provide a magnet plate for a linear motor produced by the producing method.

SUMMARY OF THE INVENTION

According to a first invention, a method for producing a magnet plate for a linear motor is provided, the magnet plate comprising a base plate and a plurality of magnets juxtaposed to one another on a surface of the base plate, the method comprising: providing the plurality of magnets on the surface of the base plate at a certain interval, placing the base plate into a mold, supplying a resin material into the mold, so as to form a resin molding covering the plurality of magnets on the surface of the base plate by means of injection molding, and magnetizing the plurality of magnets.

According to a second invention, the method according to the first invention further comprises heating the base plate, prior to the injection molding to form the resin molding on the surface of the base plate.

According to a third invention, in the method according to the first or second invention, the base plate has at least one through hole used for mounting the magnet plate for a linear motor, and the method further includes positioning the base plate in relation to the mold with the aid of the through hole, when forming the resin molding on the surface of the base plate by means of the injection molding.

According to a fourth invention, in the method according to any one of the first to third inventions, the method further includes fixing the plurality of magnets to the base plate, prior to forming the resin molding on the surface of the base plate by means of the injection molding.

According to a fifth invention, in the method according to the fourth invention, the method further includes fixing the plurality of magnets to the base plate by means of an adhesive, a pin or a protrusion provided on the surface of the base plate.

According to a sixth invention, a magnet plate for a linear motor is provided, the magnet plate being produced by the method according to any one of the first to fifth inventions.

According to a seventh invention, in the magnet plate according to the sixth invention, the resin molding is formed from epoxy resin or phenol resin.

According to an eighth invention, in the magnet plate according to the sixth or seventh invention, the plurality of magnets are rectangular parallelepiped shaped.

According to a ninth invention, in the magnet plate according to the sixth or seventh invention, the plurality of magnets have a curved portion projecting outward and having a quadratic curve or arc in cross-section shape.

According to a tenth invention, in the magnet plate according to the sixth or seventh invention, the plurality of magnets have a curved portion projecting outward having a hyperbolic cosine in cross-section shape.

These and other objects, features and advantages of the present invention will become more apparent in light of the detailed description of exemplary embodiments thereof as illustrated by the drawings.

DETAILED DESCRIPTION

Figure 1:
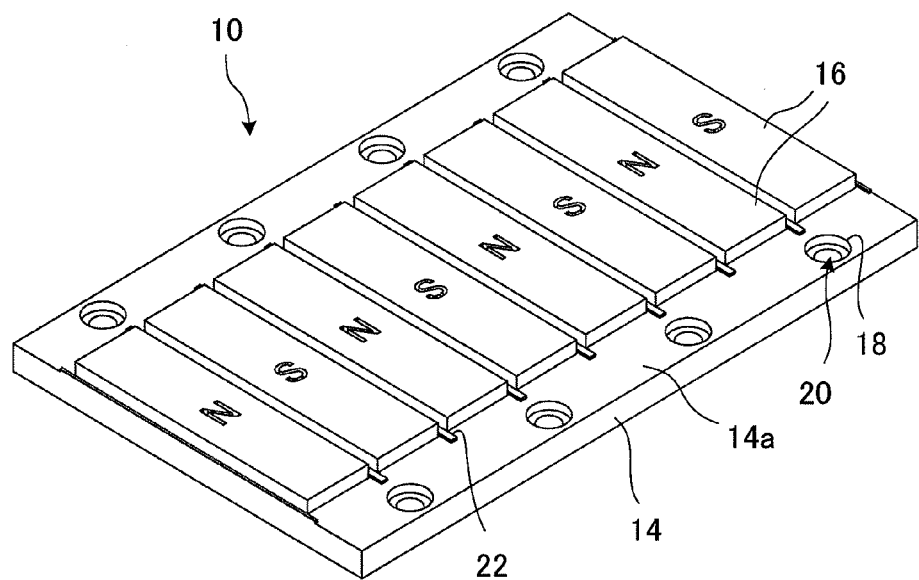
FIG. 1 is a perspective view illustrating a magnet plate according to the present invention prior to forming a resin molding.

Referring to the accompanied drawings, exemplary embodiments of the present invention will be described below. Like elements commonly used in different drawings or different embodiments are designated with the same reference numerals. In order to clarify the drawings, the scale of elements relative to one another may be different from its practical form.

A first embodiment of the present invention will be described with reference to FIGS. 1 to 3.

FIG. 1 is a perspective view illustrating a magnet plate 10 according to the present invention prior to forming a resin molding 12. The magnet plate 10 as illustrated is essentially comprised of a base plate 14 and a plurality of magnets 16 juxtaposed to one another on a surface 14a of the base plate 14. These magnets 16 are provided on the surface 14a of the base plate 14 at a certain interval such that their longitudinal side faces extend in parallel to one another. Each magnet 16 has a shape of rectangular parallelepiped in a simple manner, and any general, inexpensive and commercially available magnet may be used for this purpose. These magnets 16 are formed from a material having a magnetic property, so as to act as permanent magnets when magnetized in a predetermined direction in a subsequent process.

On the surface 14a where the magnets 16 are provided, there is at least one, preferably a plurality of through holes 18 are provided along a direction in which the magnets 16 are juxtaposed. In the illustrated embodiment, a plurality of through holes 18 are provided at a certain interval in a portion between ends of the magnets 16 in the longitudinal direction and opposing edges of the base plate in the longitudinal direction. The through hole 18 has on its inner surface a receiving part 20, which is used for receiving a known attaching means such as a bolt, when the magnet plate 10 is fixed to a support body (not shown).

At a gap between two magnets 16 adjacent to each other, there is a protruding part 22 which protrudes from the surface 14a of the base plate, respectively. The protruding part 22 is an elongated member situated along both sides of each magnet 16 in the longitudinal direction. Preferably, the protruding part 22 extends beyond both ends of each magnet 16, as illustrated in the drawing. As such, with the configuration in which the protruding parts 22 are provided at both sides of each magnet 16, the adjacent magnets 16 prevented from coming in contact with each other due to misalignment of the magnets 16.

Figure 2A:
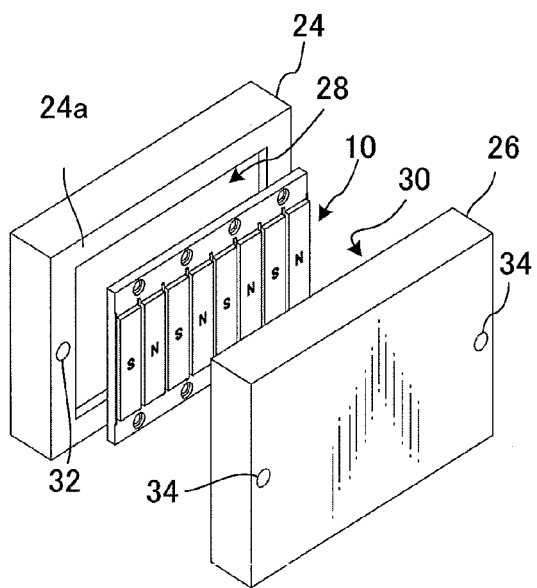
FIG. 2A is an exploded perspective view illustrating a process of injection molding in a method for producing a magnet plate according to the present invention.
Figure 2B:
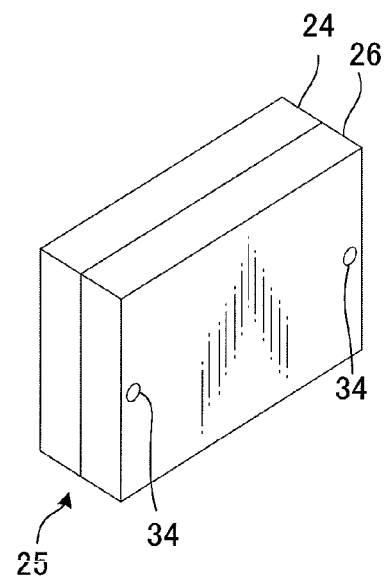
FIG. 2B is a perspective view illustrating an exterior appearance of the magnet plate in a state where the magnet plate is placed inside a mold for the injection molding.

Next, a process of injection molding will be described with reference to FIGS. 2A and 2B. FIG. 2A is an exploded perspective view illustrating a process of injection molding in a method for producing a magnet plate 10 according to the present invention. In FIG. 2A, the magnet plate 10 is illustrated in a state before the magnet plate 10 is placed inside a mold 25 formed by mold parts 24 and 26. FIG. 2B is a perspective view illustrating an exterior appearance of the magnet plate 10 in a state where the magnet plate 10 is placed inside the mold 25 for the injection molding. In FIG. 2B, the mold 25 is formed by joining the mold part 24 and the mold part 26, and the magnet plate 10 is held within the mold 25 in a sealing manner. According to the present invention, a resin material is injected into the mold 25, thereby forming on the surface 14a of the base plate 14 the resin molding 12 which covers the plurality of magnets 16 by means of injection molding.

As shown in FIG. 2A, the mold part 24 has a recess 28 for receiving the magnet plate 10. The mold part 24 also has a frame-like joining portion 24a in the circumference of the recess 28. On opposed sides of the joining portion 24a, there are a pair of fixing holes 32 and 32, only one of which can be seen in the drawing. The mold part 26 has a joining portion (not shown) which has a corresponding shape to the joining portion 24a of the mold part 24. The mold 25 for the injection molding is formed by joining these mold parts.

Although it cannot be seen in FIGS. 2A and 2B, the mold part 26 has a recess 30 for shaping the resin molding 12 into a desired shape. The mold part 26 also has at both sides a pair of fixing holes 34 and 34 similar to those of the mold part 24.

A process of the injection molding will now be described. First, the base plate 14 of the magnet plate 10 is placed and positioned in the recess 28 of the mold part 24. When positioning the base plate 14, it is preferable to position the base plate 14 with the aid of the through holes 18 which are formed on the base plate 14 for attaching the magnet plate 10. For example, protrusions, which are not shown in the drawings, are formed on the mold part 24, and the base plate 14 is then positioned by placing the protrusions through the through holes 18. Alternatively, the base plate 14 may be fixed to the mold part 24 by placing temporary fixing means such as bolts through the through holes 18. In this way, when the base plate 14 is positioned, it is not necessary to prepare a separate jig or provide a particular means for temporary fixing, thereby improving the efficiency of the process.

In addition, before the magnet plate 10 is provided in position to the mold part 24, the base plate 14 is heated prior to the subsequent process, preferably heated to a temperature suitable for curing the resin material, which will be described below. By heating the base plate 14 beforehand, it is possible to heat the mold 25 more quickly to the temperature for curing the resin material, thereby improving the efficiency of the injection molding process.

Subsequently, the mold part 26 is attached to the mold part 24 so as to cover the opening of the mold part 24. During this process, fixing means such as bolts are placed through the fixing holes 32 and 32 and the fixing holes 34 and 34 in order to fasten their joining parts, while the joining part 24a of the mold part 24 and the joining part of the mold part 26, which is not shown in the drawing, remain in contact with each other.

Into the mold 25 for the injection molding formed in such a way, a resin material, which has been heated to about 80 degrees to about 120 degrees Celsius so as to be softened, are injected with increased pressure. The resin material used in this embodiment may be a thermosetting resin such as epoxy resin or phenol resin, for example. Epoxy resin or phenol resin has good resistance to chemical products used for a cutting agent or grinding agent. With these materials, the resin molding 12 is less likely to deteriorate, and durability of magnet plate 10 and therefore that of the linear motor will be improved. This is particularly beneficial when the linear motor including the magnet plate 10 of the present invention is used as a driving means for various machine tools. The mold 25 is heated to a temperature high enough for the resin material inside the mold 25 to be cured within adequate time. In this embodiment, the mold 25 is heated to a temperature from about 180 degrees to 200 degrees Celsius, especially to about 180 degrees Celsius, for example.

Any thermosetting resin other than epoxy resin or phenol resin described above may also be used for the resin molding 12. A thermoplastic resin may also be used for the resin molding 12. In these cases, the temperature of the mold 25 or the temperature of the base plate 14 during the injection molding process can be changed in accordance with a known technique, irrespective of the temperature range described above.

Figure 3:
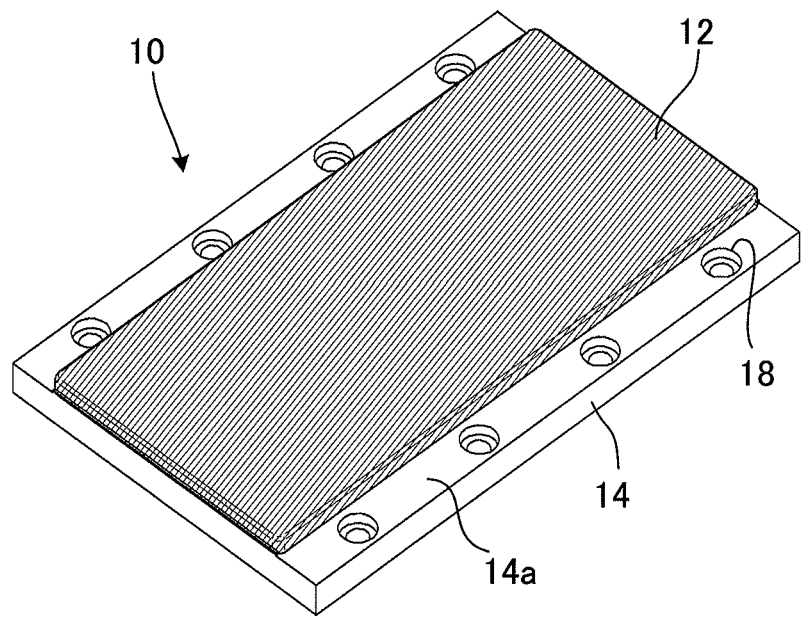
FIG. 3 is a perspective view illustrating the magnet plate according to the present invention.

FIG. 3 is a perspective view illustrating the magnet plate 10 according to the present invention. In FIG. 3, the magnet plate 10 is illustrated in a state where the magnet plate 10 is removed from the mold 25. The resin molding 12 is formed on the surface 14a of the base plate 14 so as to cover the plurality of the magnets 16. In this state, the plurality of magnets 16 on the base plate 14 are magnetized. As shown in FIG. 1 in which character "N" or "S" is illustrated on the surface of the magnets 16, the magnets 16 are magnetized such that the adjacent magnets 16 have an opposite magnetizing direction in relation to one another. In this way, since the magnets 16 are magnetized only after the injection molding, no attracting force between the magnets 16 and the mold 25 is involved during the injection molding process described above. Therefore, it is easy to remove the magnet plate 10 from the mold 25.

As described above, according to the present invention, the resin molding 12 is formed by means of the injection molding. This makes it possible to omit a process for reshaping the resin molding 12 into a proper shape after the resin molding 12 is formed, thereby simplifying the process. Accordingly, it is possible to produce the magnet plate 10 for a linear motor at a lower cost.

Next, variants of the present invention will be described. Matters which have already been described in relation to the above embodiment and also apply to the following variants are omitted from the following explanation.

Figure 4:
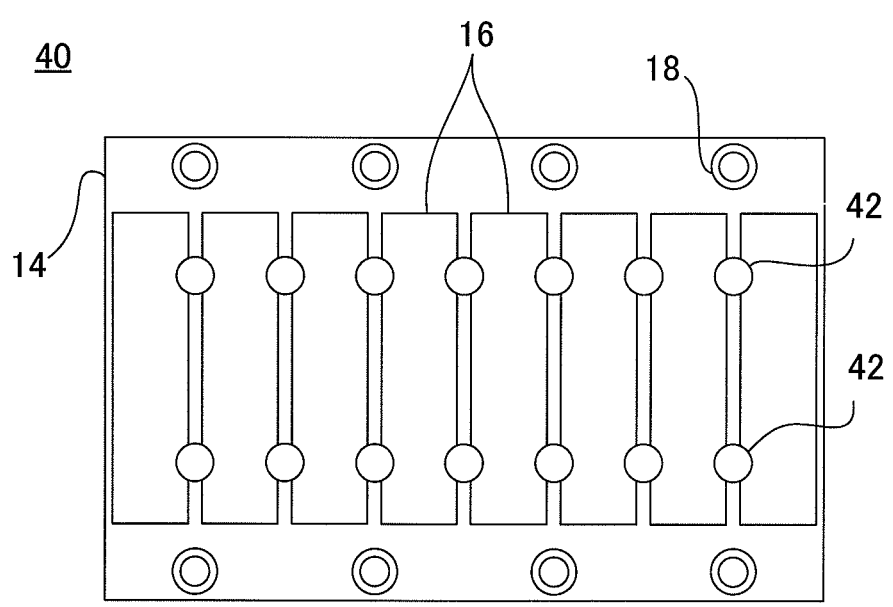
FIG. 4 is a plan view illustrating a variant of the magnet plate according to the present invention.

FIG. 4 illustrates a variant of the magnet plate according to the present invention. The magnet plate 40 as illustrated according to the variant is shown in a state before the resin molding 12 is formed by means of the injection molding, and thus, the magnets 16 are exposed. In contrast to the magnet plate 10 according to the above embodiment, the magnet plate 40 of this variant is different in that a plurality of magnets 16 are fixed to the base plate 14 by means of pins 42. The pins 42 are in the form of a rivet or wedge. By placing the pins 42 through a gap between the adjacent magnets 16, the magnets 16 are fastened to the base plate 14. In this way, it is ensured that misalignment of the magnets 16 on the surface 14a of the base plate 14 is prevented. Therefore, even if strong force is abruptly applied to the magnets 16 or the base plate 14 during a following injection molding, no misalignment of the magnets 16 occurs.

The way in which the magnets 16 are fixed to the base plate 14 prior to the injection molding is not limited to the above example. Instead of the pins 42, for example, the magnets 16 may also be adhered to the surface 14a of the base plate 14 by means of an adhesive. Alternatively, a protrusion (not shown) which, for example, has a T-shaped cross section and protrudes from the surface 14a of the base plate 14 may be provided to a gap between the magnets 16, and brought into contact with the surface of the magnets 16, so as to fix the magnets 16.

Figure 5:
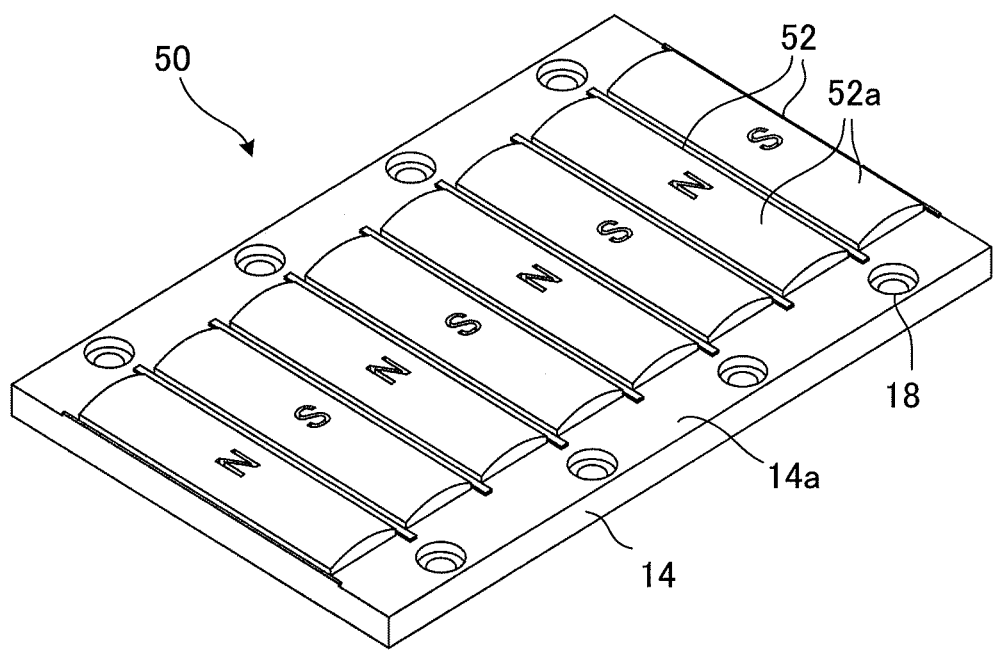
FIG. 5 is a perspective view illustrating a different variant of the magnet plate according to the present invention.
Figure 6:
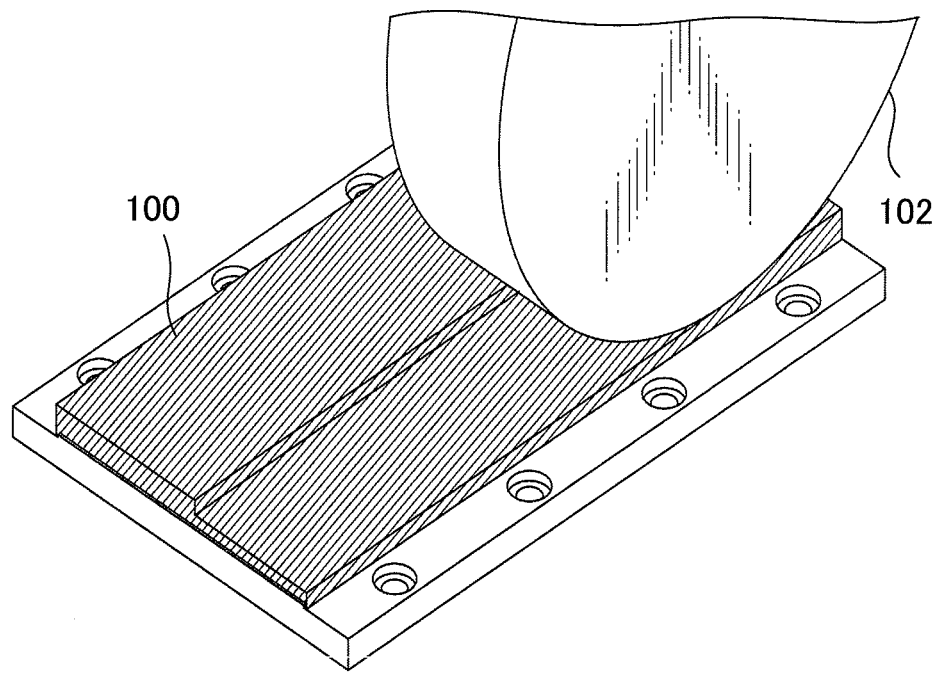
FIG. 6 is a perspective view illustrating a process for grinding a resin molding in a method for producing a magnet plate according to a prior art.

FIG. 5 is a perspective view illustrating a different variant of the magnet plate according to the present invention. As best seen when compared with FIG. 1, magnets 52 of a magnet plate 50 according to this variant have outer surfaces which are curved so as to project outward. More specifically, the magnets 52 have curved portions 52a which project outward and are quadratic curve or arc in cross section. Alternatively, the magnets 52 may also have curved portions 52a which project outward and are hyperbolic cosine in cross section. The magnet plate 50 according to this variant allows a rotor (slider) to move smoothly along the magnet plate 50, when the magnet plate 50 is applied to a linear motor as a stator. As a result, linear movement of the linear motor can be more smoothly and accurately controlled.

Effect of the Invention

According to the first invention, the resin molding is formed by the injection molding. Therefore, there is no need to reshape the resin molding by cutting, for example, in a subsequent process. As a result, it is possible to improve productivity and decrease the manufacturing cost.

According to the second invention, the base plate is heated to a temperature closer to that of the mold for the injection molding, prior to the injection molding. Therefore, the resin material supplied into the mold is more quickly cured, and efficiency of the process is improved.

According to the third invention, the through holes on the base plate are used not only for fixing the magnet plate, but also for positioning the magnet plate during the injection molding. Therefore, the injection molding is smoothly carried out without use of an additional jig or other temporary fixing means.

According to the fourth invention, the magnets are fixed onto the base plate beforehand. Therefore, it is ensured that misalignment of the magnets is prevented, when the base plate is placed in the mold for the injection molding, for example.

According to the fifth invention, the magnets can be fixed to the base plate in a simple manner, and therefore efficiency is improved.

According to the sixth invention, a magnet plate for a linear motor, which is produced by an efficient method and therefore inexpensive, is provided.

According to the seventh invention, the resin molding is formed from epoxy resin or phenol resin, which has good resistance to chemical products of a cutting agent or grinding agent. As a result, durability of the magnet plate of the linear motor is improved.

According to the eighth invention, the magnets have a rectangular parallelepiped shape. Therefore, the magnets are easily manufactured, thereby providing an inexpensive magnet plate for a linear motor.

According to the ninth invention, the motor of the linear motor can smoothly move along the magnets.

According to the tenth invention, the motor of the linear motor can even more smoothly along the magnets.

Although the invention has been shown and described with exemplary embodiments thereof, it should be understood by those skilled in the art that the foregoing and various other changes, omissions and additions may be made therein and thereto without departing from the spirit and scope of the invention.

The invention claimed is:

1. A method for producing a magnet plate for a linear motor, the magnet plate comprising a base plate and a plurality of magnets juxtaposed to one another on a surface of the base plate, the method comprising:
   providing the plurality of magnets on the surface of the base plate at a certain interval such that there is direct contact between the plurality of magnets and the base plate;
   placing the base plate into a hollow portion of a mold;
   supplying a resin material into the mold, so as to form a resin molding covering the plurality of magnets on the surface of the base plate by means of injection molding; and
   magnetizing the plurality of magnets,
   wherein the base plate is a rectangular plate having a length, a width and a height, the height smaller than the length and the width, wherein a first surface of the base plate is established on a side normal to a direction in the height direction, and wherein the magnets are directly supported on the first surface of the base plate, and
   wherein the magnets are rectangular magnets, the magnets having a length, a width and a height, the respective heights of the magnets smaller than the respective lengths and respective widths of the magnets, wherein a second surface is established on a side of the magnet normal to a direction in the height direction of the magnet, and wherein the second surface is parallel to the first surface.

2. A method for producing a magnet plate for a linear motor, the magnet plate comprising a base plate and a plurality of magnets juxtaposed to one another on a surface of the base plate, the method comprising:
   providing the plurality of magnets on the surface of the base plate at a certain interval such that there is direct contact between the plurality of magnets and the base plate;
   placing the base plate into a hollow portion of a mold;
   supplying a resin material into the mold, so as to form a resin molding covering the plurality of magnets on the surface of the base plate by means of injection molding; and
   magnetizing the plurality of magnets,
   wherein the base plate is a rectangular plate having a length, a width and a height, the height smaller than the length and the width, wherein a first surface of the base plate is established on a side normal to a direction in the height direction, and wherein the magnets are directly supported on the first surface of the base plate.

3. A method for producing a magnet plate for a linear motor, the magnet plate comprising a base plate and a plurality of magnets juxtaposed to one another on a surface of the base plate, the method comprising:
   providing the plurality of magnets on the surface of the base plate at a certain interval such that there is direct contact between the plurality of magnets and the base plate;
   placing the base plate into a hollow portion of a mold;
   supplying a resin material into the mold, so as to form a resin molding covering the plurality of magnets on the surface of the base plate by means of injection molding; and
   magnetizing the plurality of magnets,
   wherein the hollow portion of the mold is a rectangular hollow portion, and wherein the base plate is a rectangular base plate having proportional dimensions to the hollow portion.

* * * * *